United States Patent
Funakoshi

(10) Patent No.: US 7,280,445 B2
(45) Date of Patent: Oct. 9, 2007

(54) OPTICAL PICK-UP

(75) Inventor: Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 544 days.

(21) Appl. No.: 10/986,037

(22) Filed: Nov. 12, 2004

(65) Prior Publication Data
US 2005/0117492 A1    Jun. 2, 2005

(30) Foreign Application Priority Data
Nov. 14, 2003    (JP)    ............ P.2003-384535

(51) Int. Cl.
*G11B 7/00* (2006.01)
(52) U.S. Cl. .............. 369/44.25; 369/44.27; 369/53.23; 369/112.01
(58) Field of Classification Search ............. None
See application file for complete search history.

(56) References Cited

U.S. PATENT DOCUMENTS 6,496,454 B1 * 12/2002 Nakano ............ 369/44.37
6,700,845 B1 * 3/2004 Sako et al. ............ 369/53.22

FOREIGN PATENT DOCUMENTS

| JP | 05-101398 | 4/1993 |
| JP | 2000-306252 | 11/2000 |
| JP | 2002-352469 | 12/2002 |
| JP | A-2002-373442 | 12/2002 |
| JP | A-2002-373444 | 12/2002 |

* cited by examiner

*Primary Examiner*—Muhammad Edun
(74) *Attorney, Agent, or Firm*—Morgan, Lewis & Bockius LLP

(57) ABSTRACT

A finite optical system that a laser beam from a light source is allowed to be directly incident on an objective lens without passing a collimate lens is employed. The reference position of the objective lens is set so that converged light from the objective lens forms a focal point on a recording layer remoter from the light source of two recording layers in an optical disk. The objective lens moves in a direction of the light source side from the reference position to perform a focusing operation and read information recorded on the recording layer nearer to the light source.

4 Claims, 4 Drawing Sheets

FIG. 2A
FIG. 2B
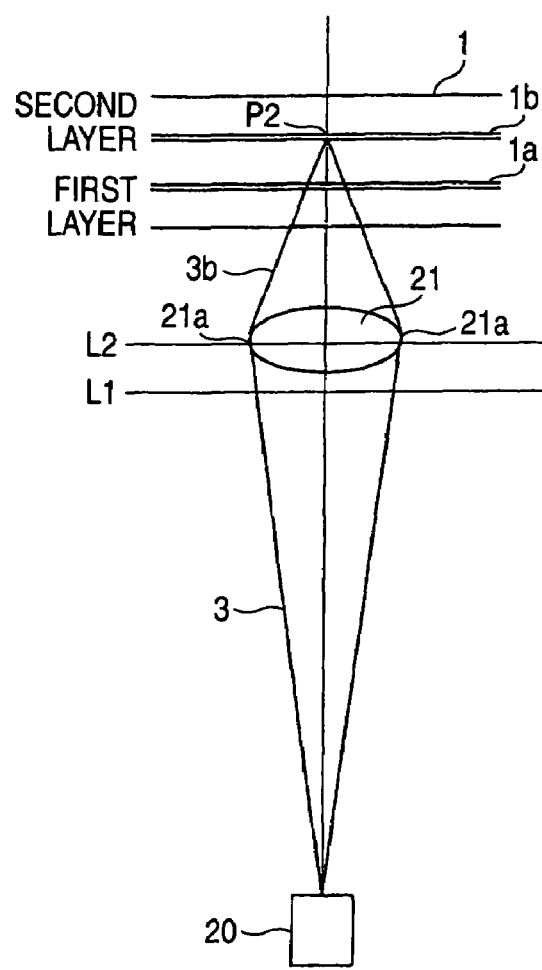
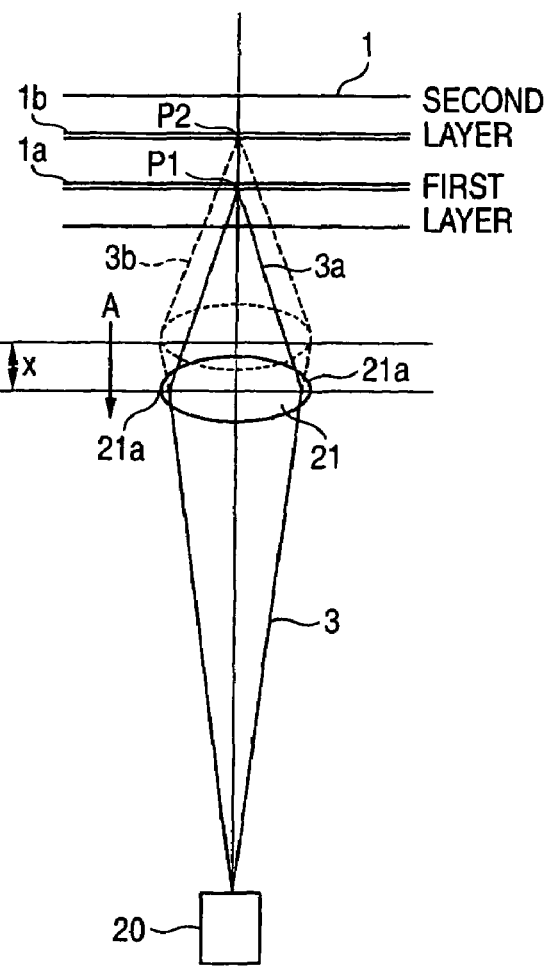

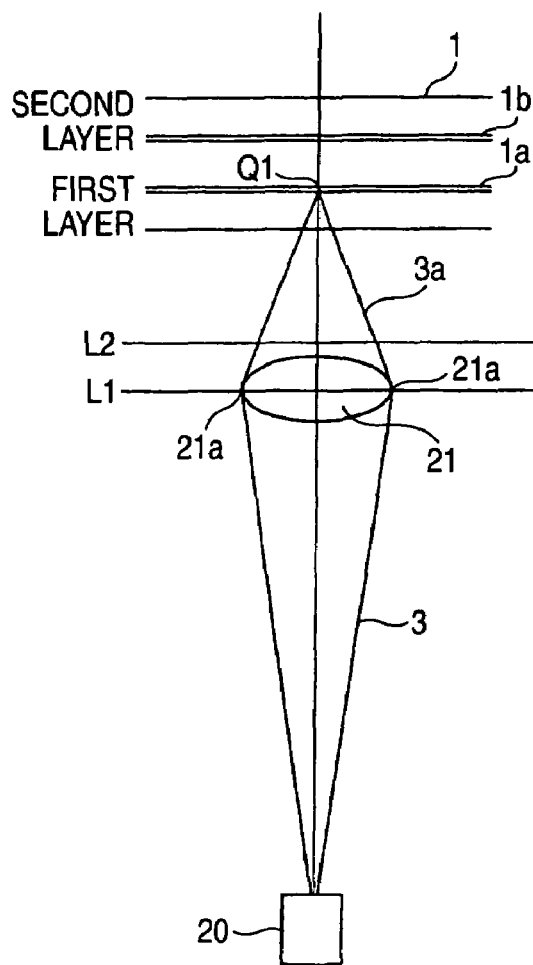
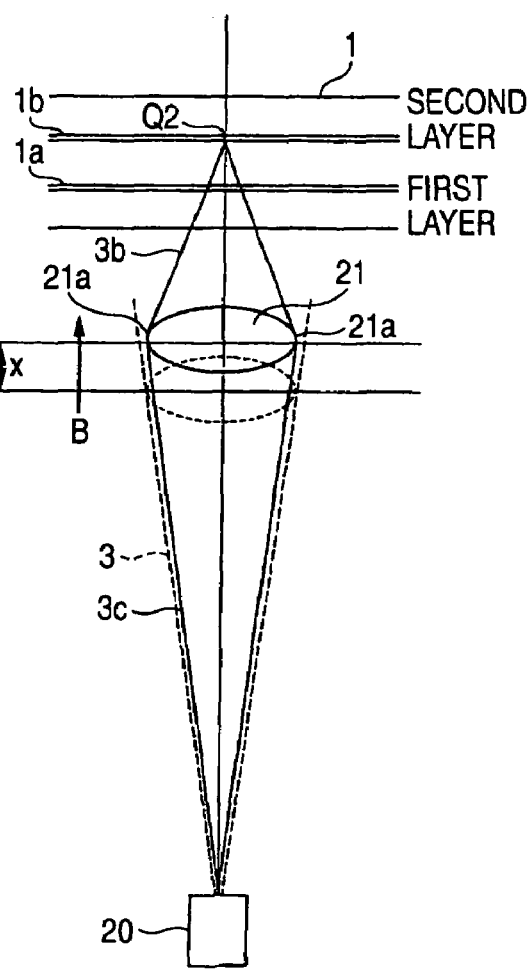
FIG. 3A
FIG. 3B

OPTICAL PICK-UP

BACKGROUND OF THE INVENTION

1. Field of the Invention

The present invention relates to an optical pick-up for reading information recorded on an optical disk such as a DVD (Digital Versatile Disk) and more particularly to an optical pick-up for reading an optical disk having a plurality of recording layers.

2. Description of the Related Art

Since the DVD as one kind of the optical disk has a large storage capacity, the DVD is employed for various kinds of uses as a media for recording images or audio. The DVD has recording layers on which information is recorded and the information recorded on the recording layers is optically read by the optical pick-up. That is, the information recording surfaces of the recording layers are irradiated with an optical beam emitted from a light emitting element (semi-conductor laser) provided in the optical pick-up and the reflected light thereof is received by the light receiving element of the optical pick-up. Then, a signal process is performed to reproduce the recorded information of the DVD. Further, recently, a DVD having two recording layers has been mainly developed to more increase the storage capacity.

In order to read the information recorded on the optical disk by the optical pick-up, the spot of the optical beam needs to be accurately converged on the information recording surface of the optical disk. Accordingly, the optical pick-up is provided with a movable objective lens. When the optical disk having the two recording layers is read, the objective lens is moved to meet the recording layer to be read to perform a focusing operation so that light emitted from the lens is focused on the recording layer to be read.

FIGS. 4A and 4B are diagrams showing an optical system of a usual optical pick-up having such an objective lens. In FIGS. 4A and 4B, 1 designates an optical disk composed of a DVD and having two recording layers including a first recording layer 1a and a second recording layer 1b on which information is recorded. 50 designates a light source that applies a laser beam to the optical disk 1. 51 designates a collimate lens for converting the laser beam 53 into parallel lights 53c. 52 designates a movable objective lens for converging the parallel lights 53c from the collimate lens 51 on the recording layers 1a and 1b of the optical disk 1. An infinite optical system of the optical pick-up is formed with these parts.

In FIG. 4A, converged lights 53a from the objective lens 52 form a focal point F1 on the recording layer 1a to read the information recorded on the recording layer 1a by the optical pick-up. When the recording layer is changed to read the information recorded on the recording layer 1b, the objective lens 52 is moved upward (in a direction of C) as shown in FIG. 4B. At this time, a moving distance y is a distance corresponding to a space between the recording layer 1a and the recording layer 1b. Thus, converged lights 53b from the objective lens 52 form a focal point F2 on the recording layer 1b to read the information recorded on the recording layer 1b by the optical pick-up.

The optical pick-up for reading the optical disk having a plurality of recording layers by the above-described infinite optical system is disclosed in, for instance, a below-described JP-A-2002-373444. Further, JP-A-2002-373442 discloses an optical pick-up composed of a semi-finite optical system having an intermediate lens for converging an optical beam between a light source and a beam splitter or an optical pick-up that uses an optical system including a first optical element between a light source and a beam splitter and a second optical element between the beam splitter and an objective lens.

However, in the case of the optical pick-up using the infinite optical system as shown in FIGS. 4A and 4B, the collimate lens 52 is necessary, so that the number of parts is disadvantageously increased to raise a cost. On the other hand, in the case of the optical pick-up disclosed in the JP-A-2002-373442, the collimate lens is not necessary, however, the intermediate lens or the optical elements are necessary in place thereof. Accordingly, the number of parts is still large and a cost cannot be avoided from increasing.

As compared therewith, in an optical pick-up for reading a CD (Compact Disk), a finite optical system that an optical beam emitted from a light source is allowed to be directly incident on an objective lens and converged on the disk is employed. Thus, a method may be considered that such a finite optical system is used for an optical pick-up for a DVD to save a collimate lens. Specifically, in the finite optical system, since only one focus of the objective lens is fixed, a problem does not arise in the CD that has basically one recording layer. However, in the DVD having a plurality of recording layers, a reproducing accuracy is greatly different depending on which of the layers a focal point is set to. The above-described situation arises because of a reason why the quantity of reflected light is different respectively in the recording layers due to the attenuation of light or the like. Thus, even when the focal point is slightly diffused, information can be read in the recording layer having a large quantity of reflected light, however, when a focal point is diffused, information is extremely hardly read with accuracy in a recording layer having a small quantity of reflected light. Accordingly, when a technique of the optical pick-up for the CD is simply diverted to that of the optical pick-up for the DVD, technical problems to be solved still remain.

SUMMARY OF THE INVENTION

It is an object of the present invention to provide an optical pick-up in which a cost can be lowered by saving a collimate lens and information recorded in any of recording layers can be read with high accuracy.

An optical pick-up according to the present invention concerns an optical pick-up for reading an optical disk in which information is recorded respectively on a plurality of recording layers. The optical pick-up includes: a light source for applying an optical beam to the optical disk and a movable objective lens for converging the optical beam on the recording layers. An optical system including the light source and the objective lens is a finite optical system in which the optical beam emitted from the light source is incident on the objective lens without passing a collimate lens. The objective lens has a reference position set so that the incident optical beam forms a focal point on the recording layer of the plurality of recording layers in the optical disk remotest from the light source. When the information of other recording layers is read, the objective lens is moved to the light source side from the reference position to perform a focusing operation.

In the present invention, since the optical beam emitted from the light source is directly incident on the objective lens without passing the collimate lens, the collimate lens can be saved to reduce the number of parts. Further, for instance, a disk having two layers is used as an example. In this case, a second layer remoter from the light source has a quantity of reflected light smaller than that of a first layer nearer to the light source. Accordingly, when an optical design that the focal point of the optical beam is formed on the first layer is made, information recorded on the second layer is hardly reproduced. In the present invention, the second layer is focused so that the focal point of the optical beam is formed on the second layer. Thus, the information recorded on the second layer having a small quantity of reflected light can be read and reproduced with high accuracy. Further, in the first layer, since the quantity of reflected light is large, even when the focal point is slightly diffused, the recorded information can be read. Further, according to the present invention, as specifically described below, the influence of a spherical aberration of the objective lens is decreased to improve a reading accuracy.

In the present invention, an objective lens may be composed of a multi-focus lens having a plurality of focal distances. The multi-focus lens is used so that the focal point of an optical beam can be precisely formed on each of recording layers and the reading accuracy can be more improved.

According to the present invention, since the optical beam emitted from the light source is directly incident on the objective lens without passing the collimate lens, the collimate lens can be saved and the number of parts can be reduced. Further, since the recording layer remotest from the light source is focused to form the focal point of the optical beam on the recording layer, the information can be precisely read and reproduced on any of the recording layers.

BRIEF DESCRIPTION OF THE DRAWINGS

These and other objects and advantages of this invention will become more fully apparent from the following detailed description taken with the accompanying drawings in which:

FIGS. 2A and 2B are diagrams showing an optical system of the optical pick-up according to the present invention;

FIGS. 3A and 3B are diagrams showing an optical system to be compared with the present invention;

DETAILED DESCRIPTION OF THE PREFERRED EMBODIMENTS

Figure 1:
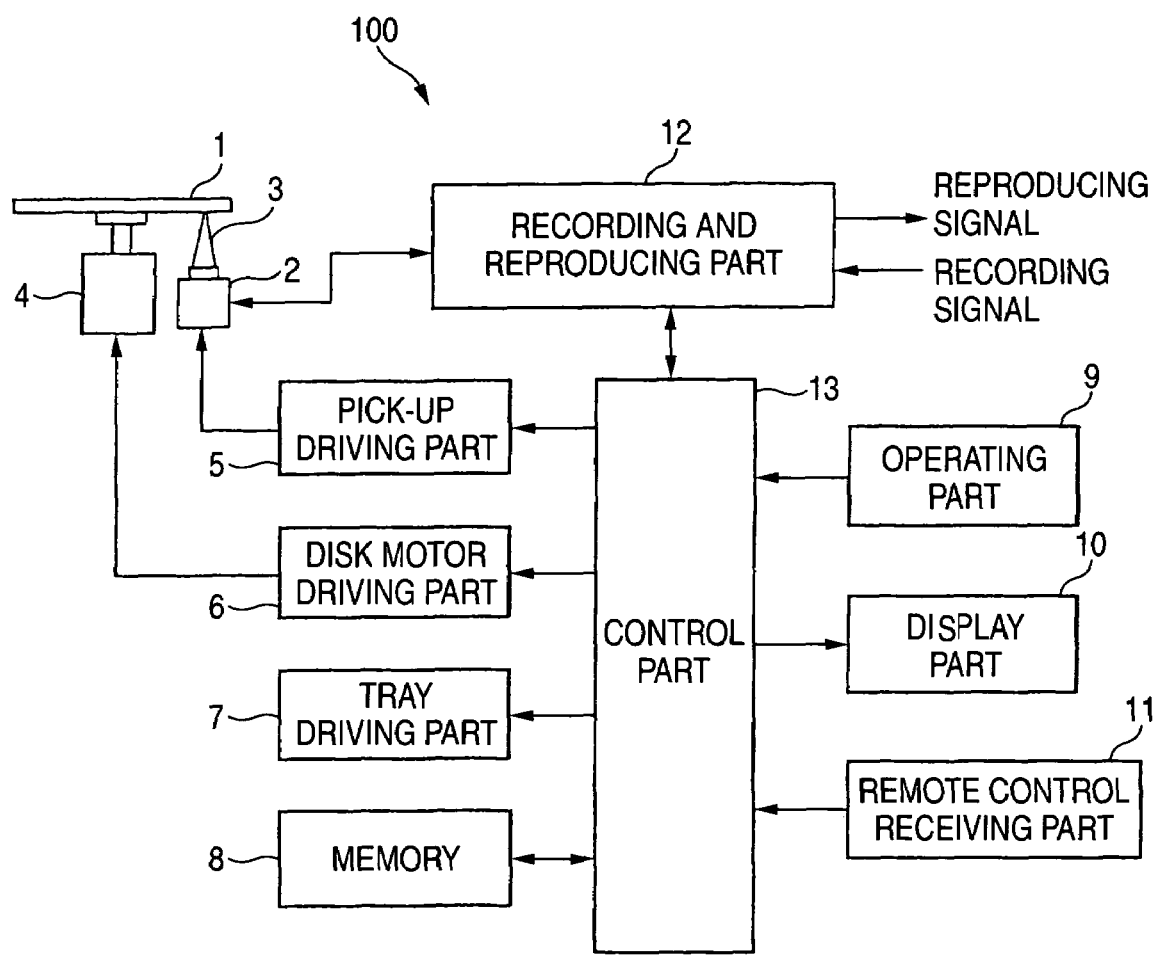
FIG. 1 is a block diagram of a DVD player to which an optical pick-up according to the present invention is applied.
Figure 4A:
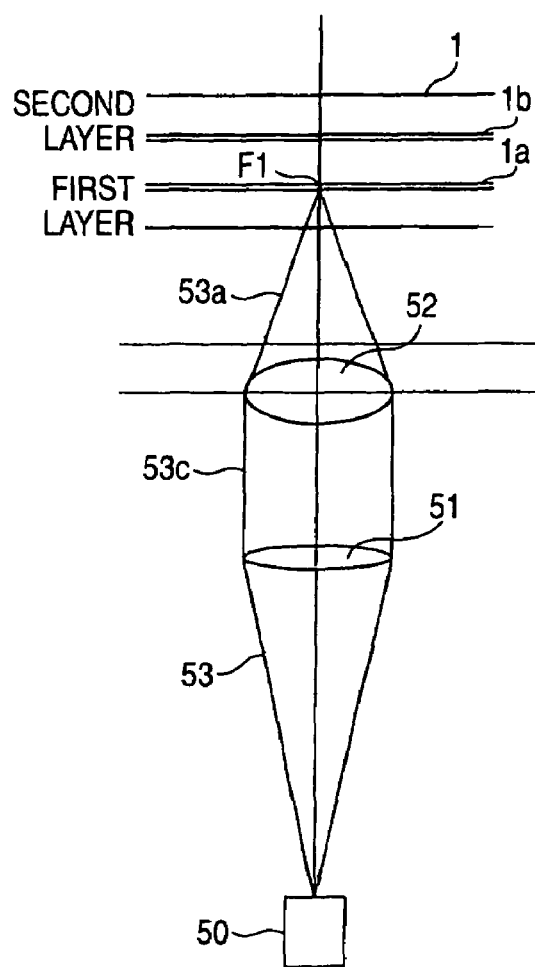
FIGS. 4A and 4B are diagrams showing an optical system of a usual optical pick-up.
Figure 4B:
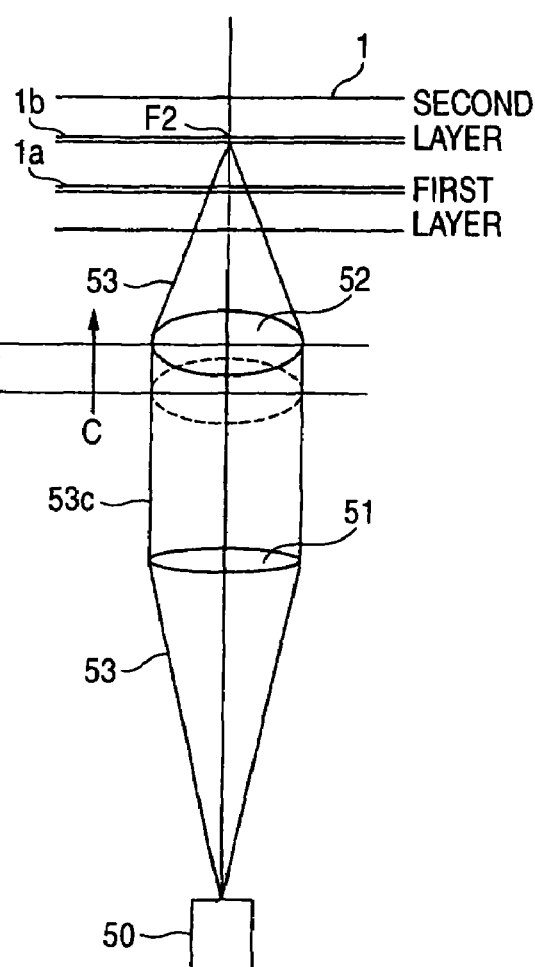

FIG. 1 shows a block diagram of a DVD player to which an optical pick-up according to the present invention is applied. In FIG. 1, reference numeral 1 designates an optical disk composed of a DVD, 2 designates an optical pick-up for applying a laser beam 3 to the optical disk 1 and receiving the reflected light thereof, 4 designates a disk motor for rotating the optical disk 1, 5 designates a pick-up driving part for driving the optical pick-up 2 and 6 designates a disk motor driving part for driving the disk motor 4. 7 designates a tray driving part for driving a tray (an illustration is omitted) on which the optical disk 1 is mounted, 8 designates a memory composed of a ROM or a RAM, 9 designates an operating part composed of keys or switches provided in a player main body, 10 designates a display part for displaying various kinds of information, 11 designates a remote control receiving part for receiving a signal from a remote controller (an illustration is omitted), 12 designates a recording and reproducing part for reproducing a signal read from the optical disk 1 or converting an externally inputted signal to a signal to be written in the optical disk 1 and 13 designates a control part composed of a CPU for controlling recording and reproducing operations or performing a servo control or the like.

FIGS. 2A and 2B are diagrams showing an optical system in the optical pick-up 2. Reference numeral 1 designates the above-described optical disk 1 composed of the DVD including two recording layers having a first recording layer 1a and a second recording layer 1b on which information is recorded. 20 designates a light source composed of a semiconductor laser for applying a laser beam 3 to the optical disk 1, and 21 designates a movable objective lens for converging the laser beam 3 emitted from the light source 20 on the recording layers 1a and 1b. An optical system having the light source 20 and the objective lens 21 is a finite optical system in which the laser beam 3 emitted from the light source 20 is incident on the objective lens 21 without passing a collimate lens.

In FIG. 2A, converged light 3b from the objective lens 21 forms a focal point P2 on the recording layer 1b. Thus, information recorded on the recording layer 1b is read by the optical pick-up 2. When the recording layer to be read is changed to read information recorded on the recording layer 1a, the objective lens 21 is moved to the light source side (in the direction of A) as shown in FIG. 2B. At this time, a moving distance x indicates a distance corresponding to a space between the recording layer 1a and the recording layer 1b. Thus, a focal point is moved from P2 to P1 to read the information recorded on the recording layer 1a by the optical pick-up 2.

In the present invention, the reference position of the objective lens 21 is set so that the laser beam 3 incident on the objective lens 21 forms the focal point P2 on the recording layer (refer it to as a second layer, hereinafter) 1b remoter from the light source 20 of the two recording layers 1a and 1b in the optical disk 1. That is, an optical design is made by setting L2 in FIG. 2A as the reference position. Then, when information of the recording layer (refer it to as a first layer, hereinafter) 1a nearer to the light source 20 is read, the objective lens 21 is moved from the position of L2 to the position of L1 to perform a focusing operation. As described above, such an optical design as to focus the laser beam on the second layer 1b is made due to below-described reasons.

A first reason is to assure a quantity of reflected light on the second layer 1b. The laser beam 3 emitted from the light source 20 is a light flux emitted at a certain angle. Accordingly, as shown in FIG. 3A, if an optical design in which the reference position of the objective lens 21 is set to L1 is made so that converged light 3a from the objective lens 21 forms a focal point Q1 on the first layer 1a, when the objective lens 21 is moved in a direction of B as shown in FIG. 3B to form a focal point Q2 on the second layer 1b, the quantity of light of the laser beam incident on the objective lens 21 will be decreased as shown by 3c (a full line). In accordance therewith, the quantity of light of converged light 3b from the objective lens 21 is also decreased. The converged light 3b whose quantity of light is decreased is more attenuated while the converged light passes through the first layer 1a to reach the second layer 1b. Thus, the quantity of light reflected on the second layer 1b is extremely lower than the quantity of light reflected on the first layer 1a, which is actually 50% or lower. As described above, when the first layer 1a is focused by the optically design, the quantity of light reflected on the second layer 1b is extremely decreased. Thus, even when the focusing operation of the objective lens 21 is performed, the information recorded on the second layer 1b hardly precisely read to deteriorate a reproducing accuracy.

As compared therewith, in the present invention, as shown in FIG. 2A, the reference position of the objective lens 21 is set so that the focal point P2 is formed on the second layer 1b in an ordinary state. Thus, when the information on the second layer 1b is read, the laser beam 3 emitted from the light source 20 is completely incident on the objective lens 21. Accordingly, the quantity of light of the converged light 3b with which the optical disk 1 is irradiated from the objective lens 21 is not decreased and a prescribed quantity or more of reflected light in the second layer 1b can be assured. Since the focal point P2 is formed on the second layer 1b, the information recorded on the second layer 1b can be precisely read. Further, when the objective lens 21 performs a focusing operation as shown in FIG. 2B to read the information on the first layer 1a, the objective lens 21 is moved to come near to the light source 20 and the laser beam 3 emitted from the light source 20 is completely incident on the objective lens 21. Accordingly, the quantity of light of converged light 3a with which the optical disk 1 is irradiated from the objective lens 21 is not decreased so that the information recorded on the first layer 1a can be precisely read.

A second reason why the second layer is focused by the optical design is to reduce an influence of a spherical aberration. The spherical aberration means a phenomenon that a deviation is generated between a focal point formed by the light passing near an optical axis of the lens and a focal point formed by the light passing the outer peripheral part of the lens. When the first layer 1a is focused by the optical design as shown in FIG. 3A, the objective lens 21 moves toward the direction (in the direction of B) remote from the light source 20 to perform a focusing operation as shown in FIG. 3B. Thus, the laser beam 3c incident on the objective lens 21 likewise exists on the outer peripheral part 21a of the lens. Consequently, the influence of the spherical aberration due to the light of the outer peripheral part 21a of the objective lens 21 is left. As a result, the focal point Q2 of the converged light 3b is not set to one. In such a way, when the focal point Q2 is diffused, since the quantity of the reflected light of the second layer 1b is decreased as described above, the information recorded on the second layer 1b is more hardly read with accuracy to deteriorate a reproducing accuracy.

As compared therewith, when the second layer 1b is focused in accordance with the optical design as in the present invention, the objective lens 21 moves toward the direction (in the direction of A) to come near to the light source 20 as shown in FIG. 2B during a focusing operation relative to the first layer 1a. Thus, the laser beam 3 is not incident on a part near the outer peripheral part 21a of the objective lens 21. As a result, the influence of the spherical aberration due to the light of the outer peripheral part of the lens can be eliminated and the focal point P1 of the converged light 3a is substantially set to one point. Further, even when the focal point P1 is formed at a position slightly deviated from the first layer 1a, the quantity of reflected light of the first layer 1a is not substantially decreased due to the attenuation of light. Thus, the influence of the deviation of the focal point can be covered so that the information recorded on the first layer 1a can be precisely read.

In the above-described embodiment, an ordinary lens is used as the objective lens 21. However, as the objective lens 21, a two-focus lens may be employed. The two-focus lens is a lens having two focal distances on the optical axis of the objective lens. The two-focus lens is used so that when the objective lens 21 carries out the focusing operation as shown in FIG. 2B, the focal point P1 can be accurately formed on the first layer 1a. Thus, a reading accuracy can be improved.

In the above-described embodiment, the optical disk having the two recording layers is mentioned as an example of a multi-layer disk. However, the present invention may be applied to a multi-layer disk having three or more recording layers. In this case, the reference position of the objective lens is set so that a focal point is formed on the recording layer remotest from the light source, and the lens is moved to the light source side from this position to perform a focusing operation.

In the above-described embodiment, the DVD is exemplified as an example of the optical disk. However, the present invention may be applied to a case that an optical disk other than the DVD is read.

What is claimed is:

1. An optical pick-up for reading an optical disk in which information is recorded on a first recording layer and a second recording layer respectively, the optical pick-up comprising:
   a light source for applying a laser beam to the optical disk; and
   a movable objective lens for converging the laser beam on the first and second recording layers, wherein:
   an optical system including the light source and the objective lens is a finite optical system in which the laser beam emitted from the light source is incident on the objective lens without passing a collimate lens;
   a reference position of the objective lens is set so that converged light from the objective lens forms a focal point on the recording layer remoter from the light source of the first and second recording layers in the optical disk; and
   when the information of the recording layer nearer to the light source is read, the objective lens is moved to the light source side from the reference position to perform a focusing operation.

2. The optical pick-up according to claim 1, wherein the objective lens is composed of a multi-focal point lens.

3. An optical pick-up for reading an optical disk in which information is recorded on a plurality of recording layers respectively, the optical pick-up comprising:
   a light source for applying an optical beam to the optical disk; and
   a movable objective lens for converging the optical beam on the recording layers; wherein:
   an optical system including the light source and the objective lens is a finite optical system in which the optical beam emitted from the light source is incident on the objective lens without passing a collimate lens;
   a reference position of the objective lens is set so that converged light from the objective lens forms a focal point on the recording layer remoter from the light source of the plurality of the recording layers in the optical disk; and
   when the information of other recording layers is read, the objective lens is moved to the light source side from the reference position to perform a focusing operation.

4. The optical pick-up according to claim 3, wherein the objective lens is composed of a multi-focal point lens.

* * * * *